United States Patent
Hatzav et al.

(10) Patent No.: US 8,781,311 B1
(45) Date of Patent: Jul. 15, 2014

(54) DOCUMENT HOLDER FOR A PORTABLE IMAGING APPARATUS

(71) Applicant: CSSN Inc., Culver City, CA (US)

(72) Inventors: Iuval Hatzav, Culver City, CA (US);
Ilan Ben-Shahar, Savion (IL); Giyora Sharaby, Moshav Neve Yarak (IL);
Daniel Hatzav, Hod Hasharon (IL)

( * ) Notice: Subject to any disclaimer, the term of this patent is extended or adjusted under 35 U.S.C. 154(b) by 1 day.

(21) Appl. No.: 13/757,743

(22) Filed: Feb. 2, 2013

(51) Int. Cl.
*G03B 15/00* (2006.01)

(52) U.S. Cl.
USPC .............................................................. 396/5

(58) Field of Classification Search
USPC .............................................................. 396/5
See application file for complete search history.

(56) References Cited

U.S. PATENT DOCUMENTS

| | | | | |
|---|---|---|---|---|
| 3,622,239 | A * | 11/1971 | Miller | 355/39 |
| 5,218,403 | A * | 6/1993 | Smith | 355/39 |
| 6,417,894 | B1 * | 7/2002 | Goff et al. | 348/832 |
| 7,194,200 | B1 * | 3/2007 | Behlow | 396/5 |
| 7,852,403 | B2 * | 12/2010 | Tsai et al. | 348/375 |
| 2005/0040298 | A1 * | 2/2005 | Ohki et al. | 248/176.1 |
| 2007/0035655 | A1 * | 2/2007 | Chen et al. | 348/373 |
| 2010/0038514 | A1 * | 2/2010 | Yu et al. | 248/449 |
| 2010/0054721 | A1 * | 3/2010 | Hsieh et al. | 396/5 |
| 2010/0080543 | A1 * | 4/2010 | Yu et al. | 396/5 |
| 2011/0142431 | A1 * | 6/2011 | Wang | 396/5 |

* cited by examiner

*Primary Examiner* — Rodney Fuller

(57) ABSTRACT

A detachable document-holding device for holding a document at a substantially fixated distance from a lens disposed at a back surface of a portable imaging apparatus. The document-holding device includes a document tray, a sliding interface having a hollow passage, and a mounting-structure and a base. The mounting-structure includes a sliding panel pivotally attached to an attachment panel. The tray and the sliding interface are pivotally interconnected. The base is securely attached to the back surface of the portable imaging apparatus, wherein the mounting-structure is operatively mounted onto the base. The hollow passage fittingly accommodates the sliding panel, facilitating a user to set the distance between the document and the lens. When in operational state, the tray is substantially perpendicular to the optical axis of the lens, wherein an image of the document, placed onto the tray, is reflected towards the lens.

13 Claims, 12 Drawing Sheets

DOCUMENT HOLDER FOR A PORTABLE IMAGING APPARATUS

FIELD OF THE INVENTION

The present invention relates to document holders and more particularly, the present invention relates to a device for holding a document, such as an ID document, wherein the document holder is detachably attached to portable imaging apparatuses, including a smart portable imaging apparatus such as a tablet PC or a smartphone. The document holding device is adapted to facilitate acquisition of digital image frames of the document, by the camera built into the smart portable imaging apparatus.

BACKGROUND OF THE INVENTION

Portable imaging apparatuses are facilitated to acquire at least one image frame of scenery, living beings and objects, including documents. To acquire an image frame of a document, a user holds the apparatus at a selected distance from the document, while viewing the expected image on the display of the apparatus. Smart portable imaging apparatuses may also process the at least one acquired image frame.

However, the conditions at which an image frame is taken are typically highly non-repeatable, as the apparatus is held by the user's hands. Furthermore, to acquire an image of several similar documents, by the same apparatus, it is highly likely to yield images that differ in scaling, skewing, panning, background, illumination and other imaging related parameters.

There exist in today's market imaging devices capable of reading documents such as ID cards, driver's license, business cards, passports, medical cards, checks and the like. In such imaging devices that include an imaging sensor array, based on technologies such as a CCD or CMOS, it is desired that the imaged document will be placed and uniformly imaged within the focal depth of the imaging sensor, in order to obtain a substantially true image of the imaged document.

There is therefore a need and it would be advantageous to have a device that is adapted to acquire images of similar documents, such that the images have similar scaling, background, panning, skewing and other imaging parameters, as well as substantially reduce the skewing.

SUMMARY OF THE INVENTION

In view of the limitations now presented in the prior art, the present invention provides a new, simple and useful detachable document holding device that is adapted to be attached to a smart portable imaging apparatus, such as a tablet PC or a smartphone. The document holding device is adapted to facilitate the acquisition of digital image frames of the document, by the camera built into the smart portable imaging apparatus.

According to the teachings of the present invention, there is provided a detachable document-holding-device for holding a document at a substantially fixated distance from a lens disposed at a back surface of a portable imaging apparatus.

The document-holding-device includes a document-tray, having an upper surface and a rear face, a sliding interface having a front face, an upper face and a hollow passage formed therein at a preconfigured location, and a mounting-structure. The mounting-structure includes a generally planer sliding panel and an attachment panel, wherein the sliding panel is pivotally attached by a first shaft mechanism to the attachment panel, and wherein the pivotal motion is facilitated by the first shaft mechanism.

The document-tray and the sliding interface are pivotally interconnected, wherein the pivotal motion is facilitated by a second cylindrical shaft.

The document-holding-device further includes a base that is securely attached to the back surface of the portable imaging apparatus, and an attachment/detachment configuration, wherein the attachment/detachment configuration is adapted to attach the attachment panel to the base, and wherein the mounting-structure is operatively mounted onto the base.

The hollow passage is preconfigured to fittingly accommodate the sliding panel, facilitating the sliding panel to slide through the hollow passage, when moved by the user, to thereby set the distance between the document-tray and the lens.

When in operational state, the document-tray is substantially perpendicular to the optical axis of the lens, wherein the upper surface of the document-tray is facing the lens, and wherein an optical path, having a fixated optical distance, is formed such that when a document is placed onto the upper surface of the document-tray, an image of the document is reflected towards the lens of the portable imaging apparatus.

Optionally, the attachment/detachment configuration includes rails formed inside the base, wherein the rails are configured to fittingly host attachment panel, and wherein the attachment panel may be pushed to slide either in or out of the rails.

The document is selected from a group including an ID card, a check, a driver's license, a business card, a passport and a medical card.

The portable imaging apparatus is selected from a group including a tablet PC, a smartphone, a PDA and a digital camera, and wherein the portable imaging apparatus having a generally flat body.

Preferably, the digital camera includes and/or is operatively connected to a processor.

Optionally, the document-tray and the sliding interface include a number of hollow elements, securely disposed at preconfigured locations on the rear face of the document-tray and the upper face of the sliding interface, wherein the tubular openings formed in the hollow elements are cylindrical to fittingly accommodate the second cylindrical shaft. A number of the hollow elements have a cylindrical external shape and at least one of the hollow elements has a cuboid external shape. The hollow opening formed in the at least one cuboid hollow element is equidistant from the three exposed faces of the cuboid hollow element that are parallel to the rotational axis of the second cylindrical shaft, wherein one of the exposed faces of the cuboid hollow element is substantially perpendicular to the upper surface of the document-tray.

Preferably, the document-holding-device is foldable, and wherein when in a folded state, the sliding panel is pivoted about the first shaft mechanism towards the back surface of the portable imaging apparatus, such that the sliding panel is disposed adjacently to the back surface, and wherein the document-tray is pivoted about the second cylindrical shaft towards the sliding panel, such that the document-tray is substantially adjacent to the sliding panel and the upper surface of the document-tray faces the sliding panel.

Optionally, the perpendicular face of the cuboid hollow element leans against the upper face of the sliding interface, and wherein the upper face serves as a stopper to document-tray.

When in an unfolded, operational state, the document-tray is pivoted about the second cylindrical shaft away from the sliding panel, such that the document-tray is substantially perpendicular to the sliding panel, wherein the rear face of the document-tray leans against the front face of the sliding interface that serves as a stopper to the document-tray; and the sliding panel is pivoted about the first shaft mechanism away from the back surface of the portable imaging apparatus, such that the sliding panel is substantially perpendicular to the back surface of the portable imaging apparatus, wherein a pair of stoppers are preconfigured to sustain the substantially perpendicular configuration of the sliding panel with respect to the back surface.

Optionally, the document-holding-device further including a fastening mechanism, used to fasten the sliding panel to the sliding interface. The fastening mechanism is selected from a group including a fastening screw, a boss type detachable mechanism, a biased plunger disposed inside an inner wall of the hollow passage that fits into a selected bore out of a number of bores formed at preconfigured locations along the sliding panel and any other type of fastening mechanisms known in the art.

The preconfigured locations of each of the bores, formed along the sliding panel, are designed to fit at least one particular portable imaging apparatus.

BRIEF DESCRIPTION OF THE DRAWINGS

The present invention will become fully understood from the detailed description given herein below and the accompanying drawings, which are generally not drawn to scale and are given by way of illustration only and thus, not limitative of the present invention, and wherein:

FIG. 2a is a top perspective view of the document-holding-device shown in FIG. 1a.

FIG. 3 is a top, side perspective view illustration of the document-holding-device shown in FIG. 1a.

FIG. 10 is a bottom, front perspective view illustration of the document-holding-device, attached to a smart portable imaging apparatus, as shown in FIG. 1a.

DETAILED DESCRIPTION OF THE INVENTION

Figure 1A:
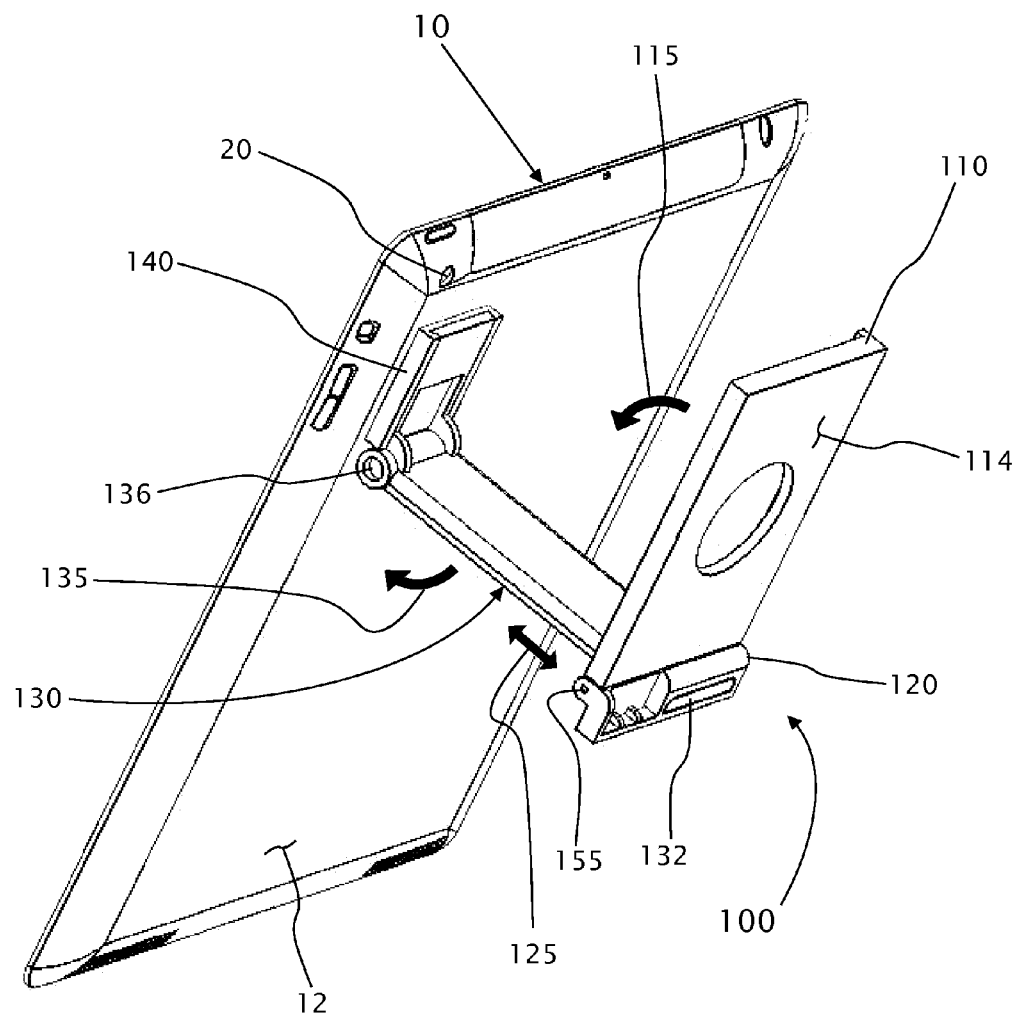
FIG. 1a is a bottom perspective view illustration of a document-holding-device for holding a document, according to embodiments of the present invention, detachably attached to a smart portable imaging apparatus, such as a tablet PC.

Before explaining embodiments of the invention in detail, it is to be understood that the invention is not limited in its application to the details of construction and the arrangement of the components set forth in the host description or illustrated in the drawings.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

Meanings of technical and scientific terms used herein are to be commonly understood as to which the invention belongs, unless otherwise defined. The present invention can be implemented in the testing or practice with methods and materials equivalent or similar to those described herein.

Reference is now made to FIG. 1a, a bottom perspective view illustration of a device 100 for holding a document, detachably attached to a smart portable imaging apparatus 10, such as a tablet PC, according to embodiments of the present invention.

Figure 3:
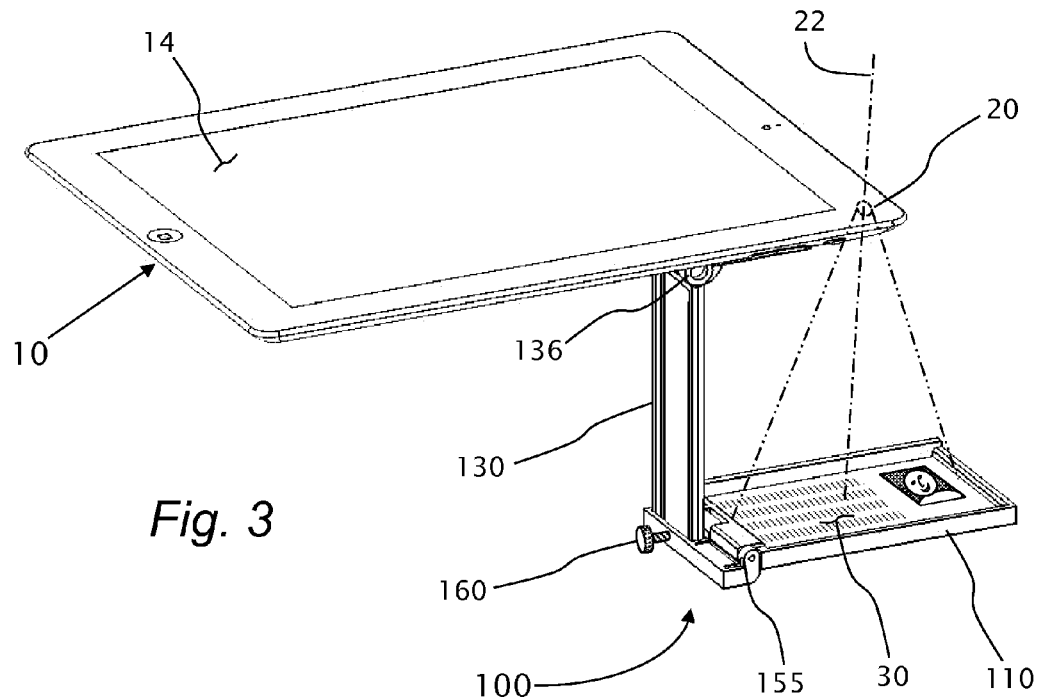

It should be noted that orientation-related descriptions such as "top" imaging device and "bottom" imaging device, assumes that smart portable imaging apparatus 10, is held in an orientation as shown in FIG. 3, that is, the normal operation orientation of the smart portable imaging apparatus, laid on a generally horizontal surface such as the top of a table.

Document-holding-device 100 includes a document-tray 110 pivotally attached to a sliding interface 120, a mounting-structure 130 and an attaching mechanism such as a base 140 for detachably attaching document-holding-device 100 to smart portable imaging apparatus 10.

It should be further noted that document-holding-device 100, shown by way of example in the figures, is configured to image ID documents such as ID cards, a drivers' license, business cards, medical cards and the like. However, with no limitation, document-holding-device 100 is not limited by the figures, and other document-trays 110, sized to accommodate documents of different sizes, disposed at a selected distance from camera lens 20 of smart portable imaging apparatus 10, may be used. An optical setting, having a set optical distance, is formed such that when a document is placed onto document-tray 110, an image of the document is formed by the ambient or any other light sources, and is reflected towards lens 20 of portable imaging apparatus 10.

Figure 1B:
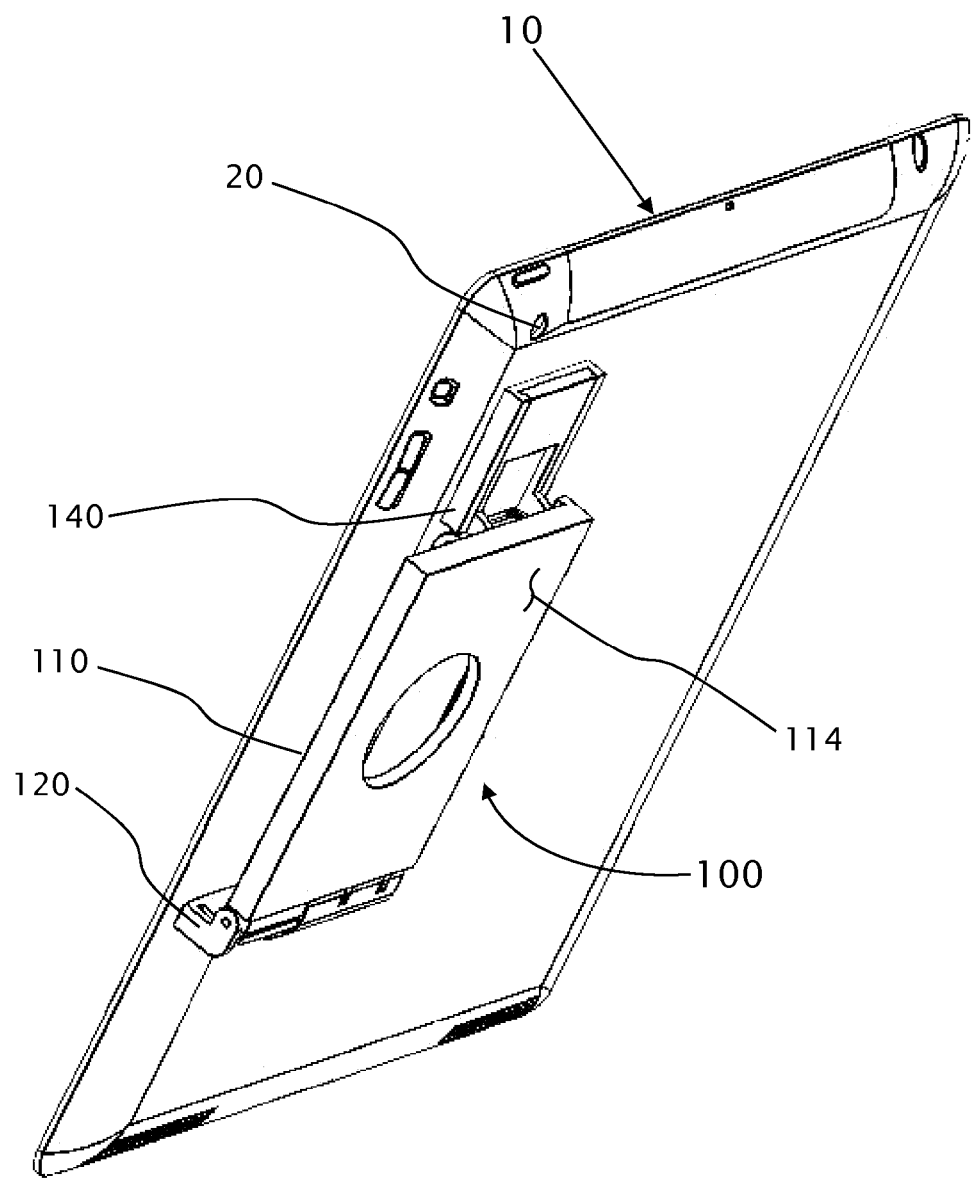
FIG. 1b is a bottom perspective view illustration of the document-holding-device, attached to a smart portable imaging apparatus, as shown in FIG. 1a, the document-holding-device being in a folded state.
Figure 2A:
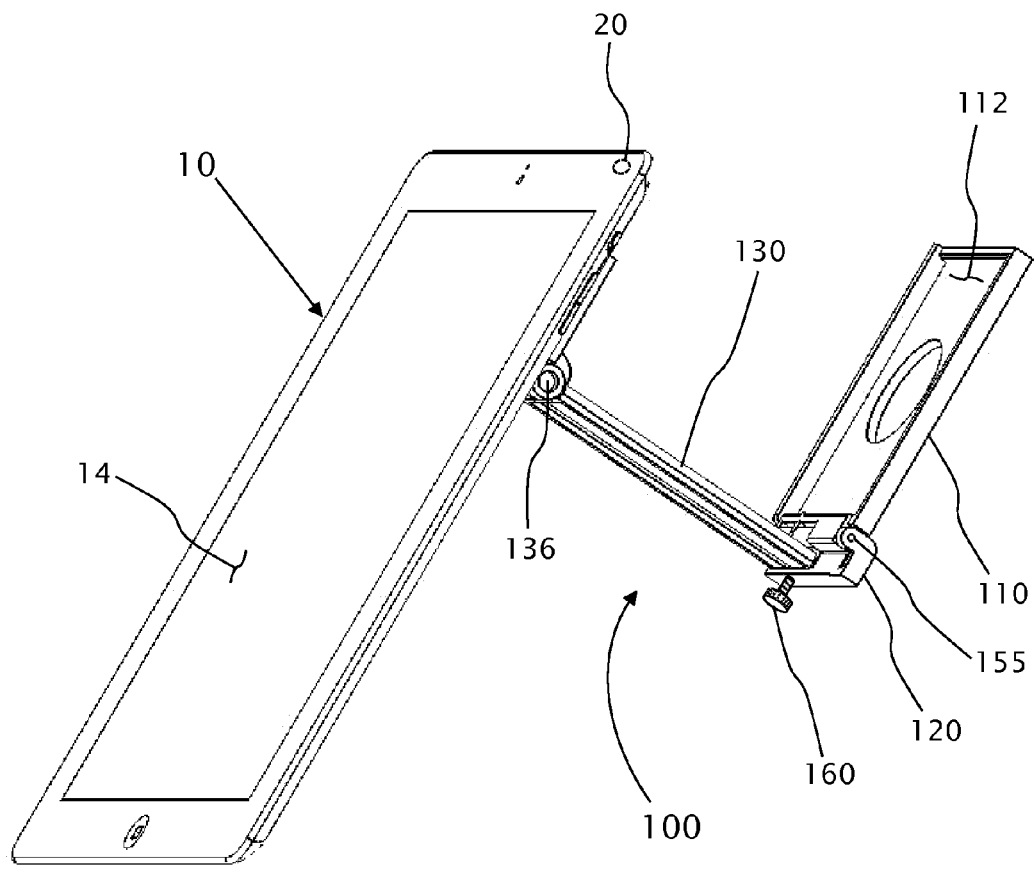
Figure 2B:
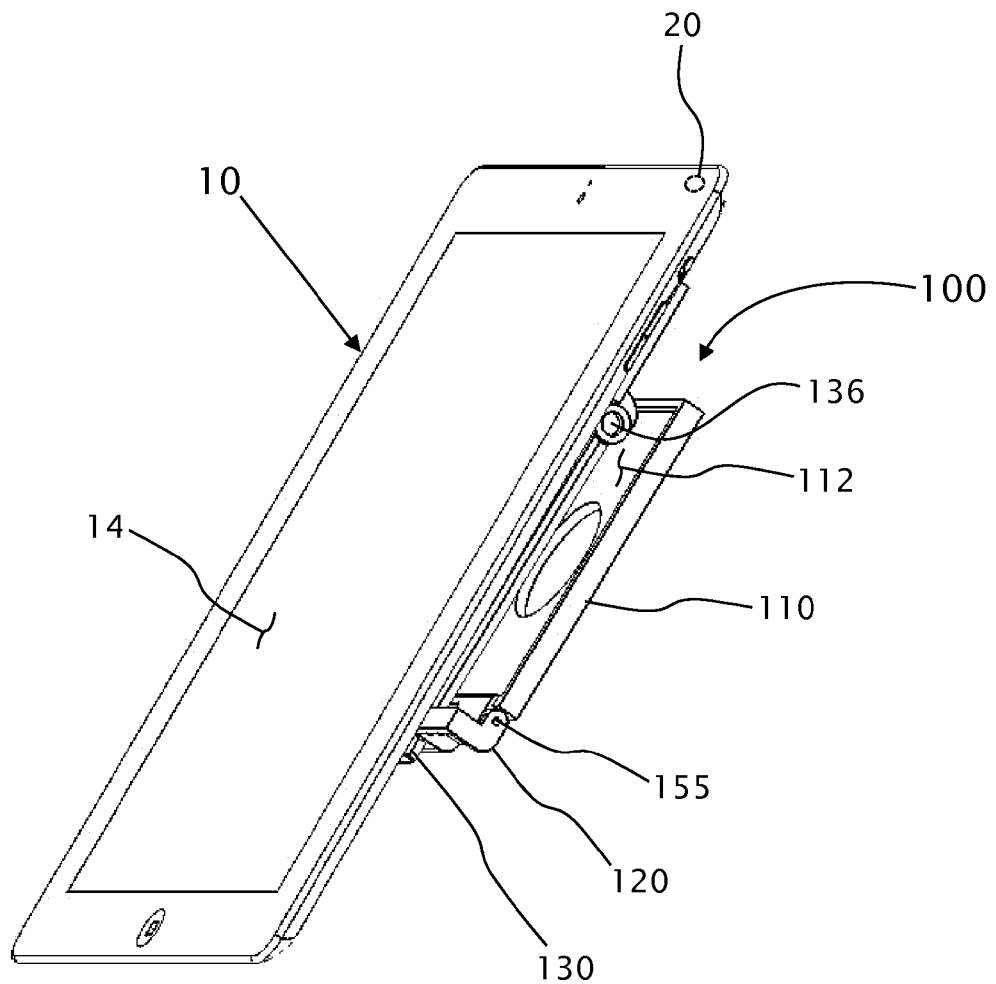
FIG. 2b is a top perspective view of the document-holding-device shown in FIG. 2a, the document-holding-device being in a folded state.

Reference is also made to FIG. 1b, a bottom perspective view illustration of document-holding-device 100, detachably attached to a tablet PC 10, according to embodiments of the present invention, the document-holding-device being in a folded state, when not in use; and to FIG. 2a, a top perspective view illustration of document-holding-device 100, being in the unfolded operational state; and to FIG. 2b is a top perspective view of the document-holding-device 100, the document-holding-device being in a folded state.

Figure 4:
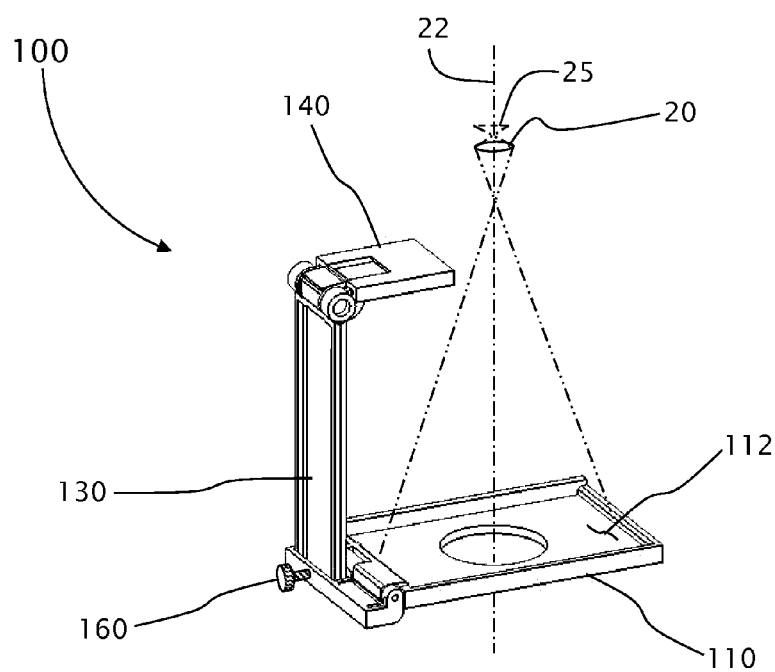
FIG. 4 is a top perspective view illustration of the document-holding-device, in an unfolded operational state, according to embodiments of the present invention.
Figure 5:
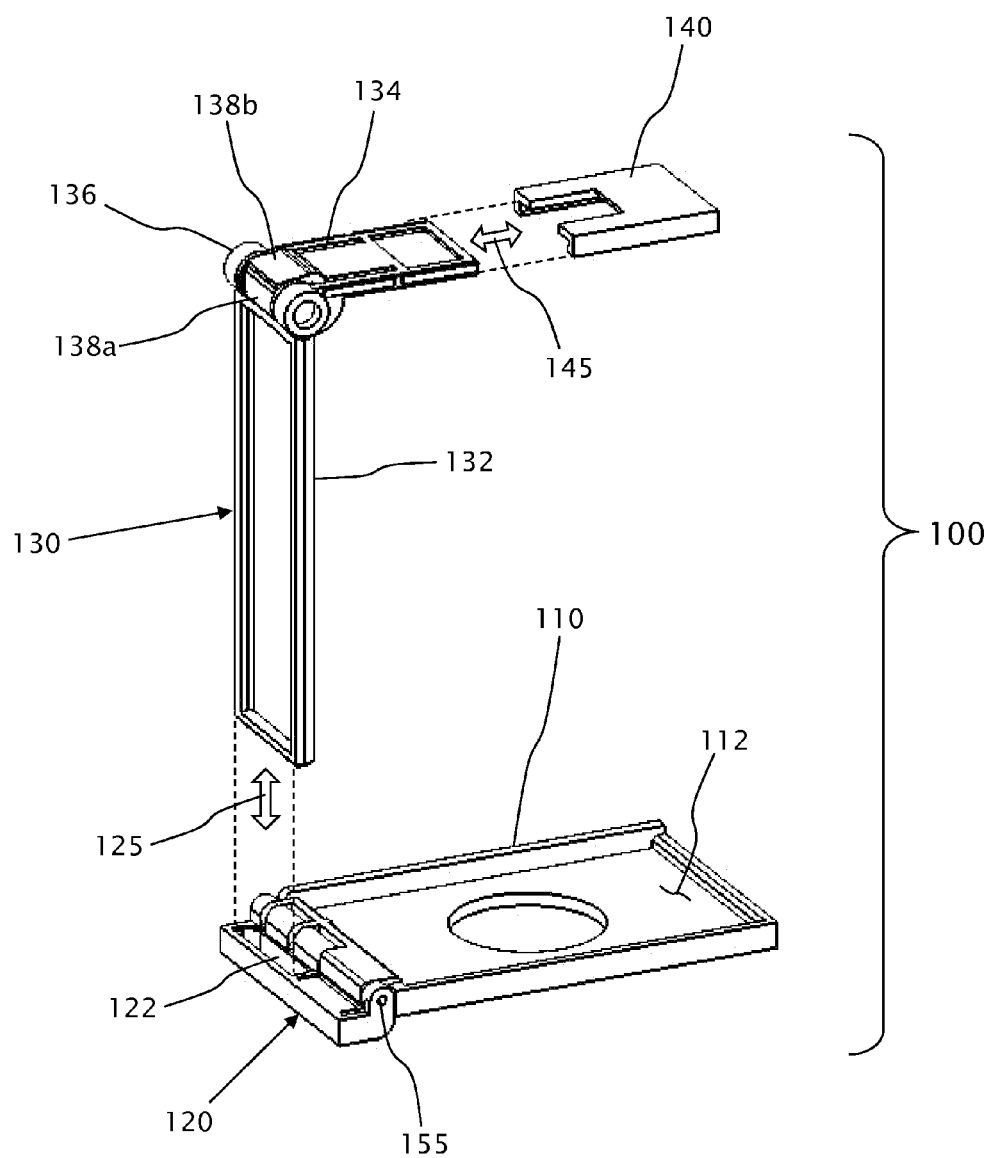
FIG. 5 is a top perspective, exploded view illustration of the document-holding-device, in an unfolded operational state.
Figure 10:
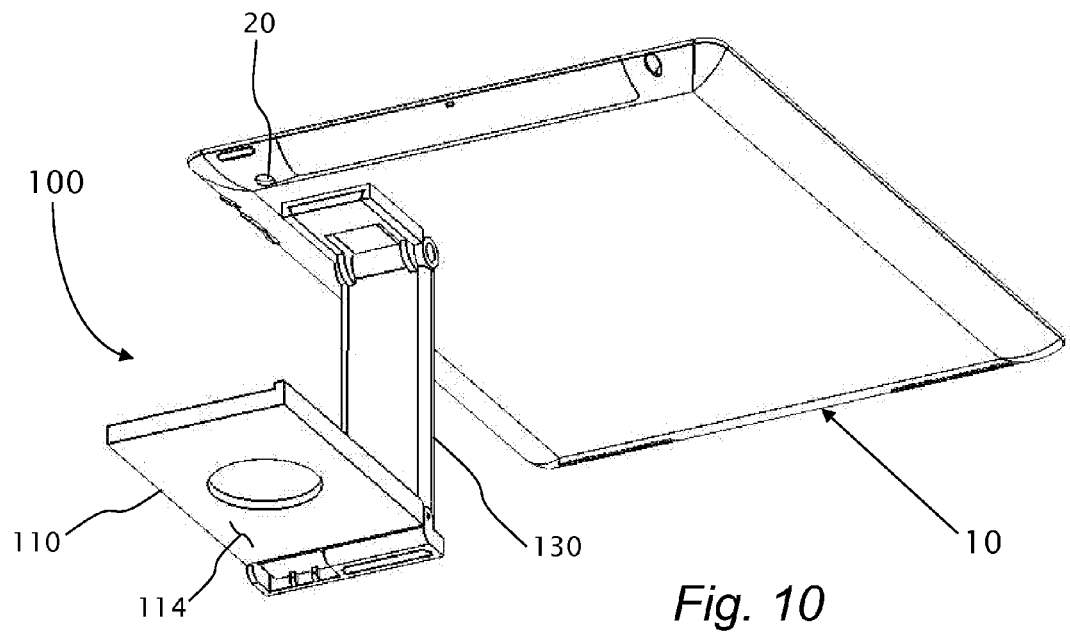
Figure 11:
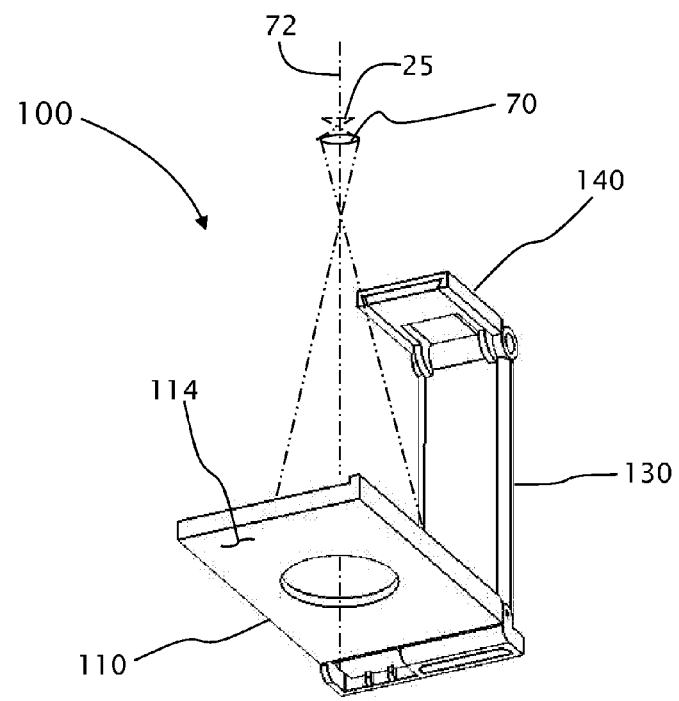
FIG. 11 is a bottom perspective view illustration of the document-holding-device, in an unfolded operational state, according to embodiments of the present invention.
Figure 12:
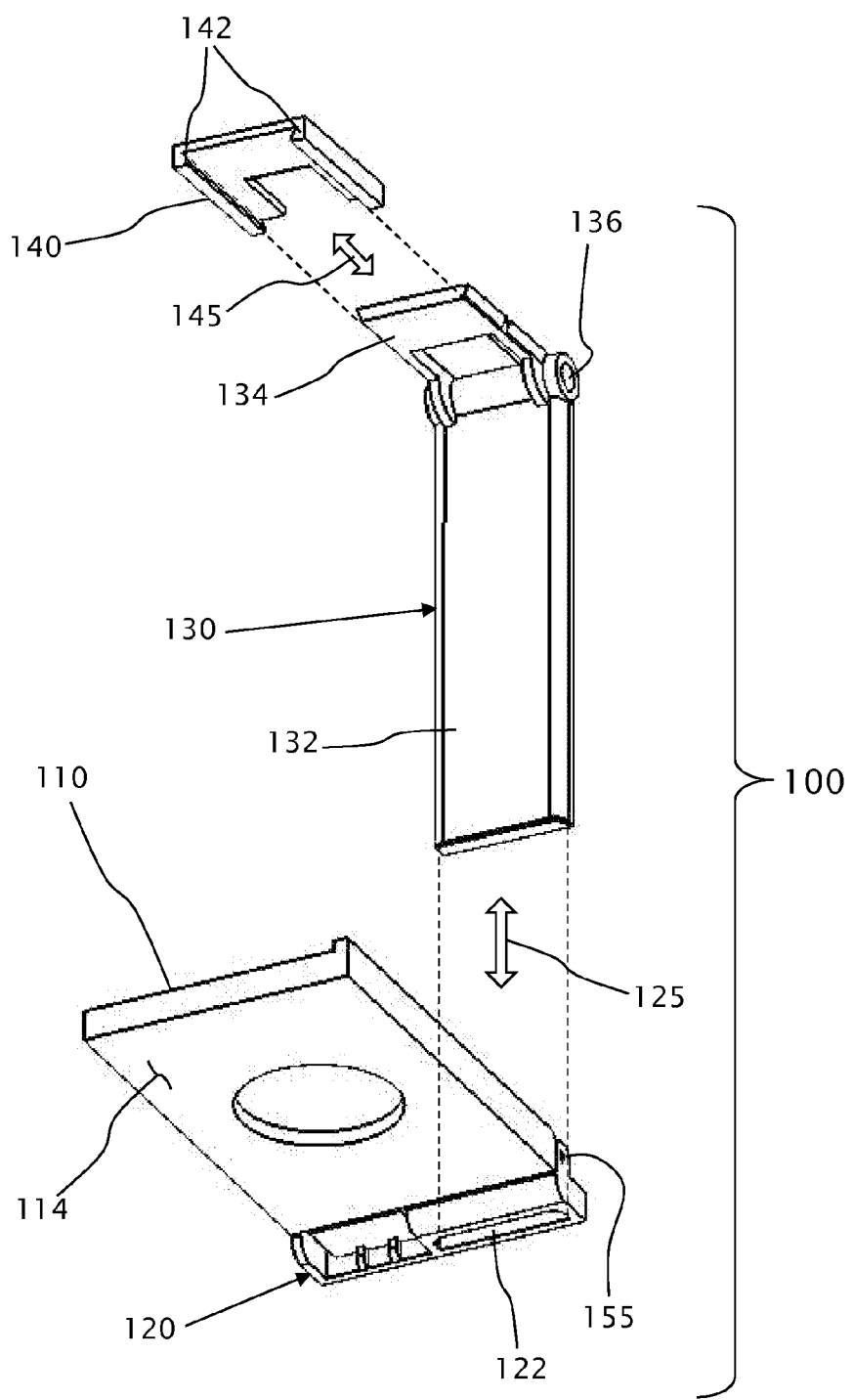
FIG. 12 is a bottom, perspective, exploded view illustration of the document-holding-device, in an unfolded operational state.
Figure 13:
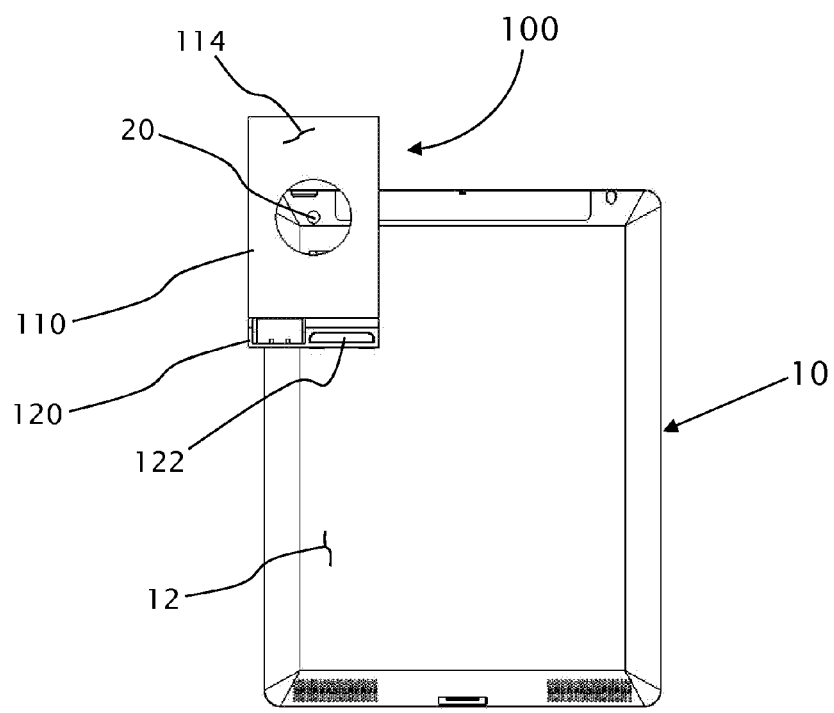
FIG. 13 is a bottom view illustration of the document-holding-device, in an unfolded operational state.
Figure 14:
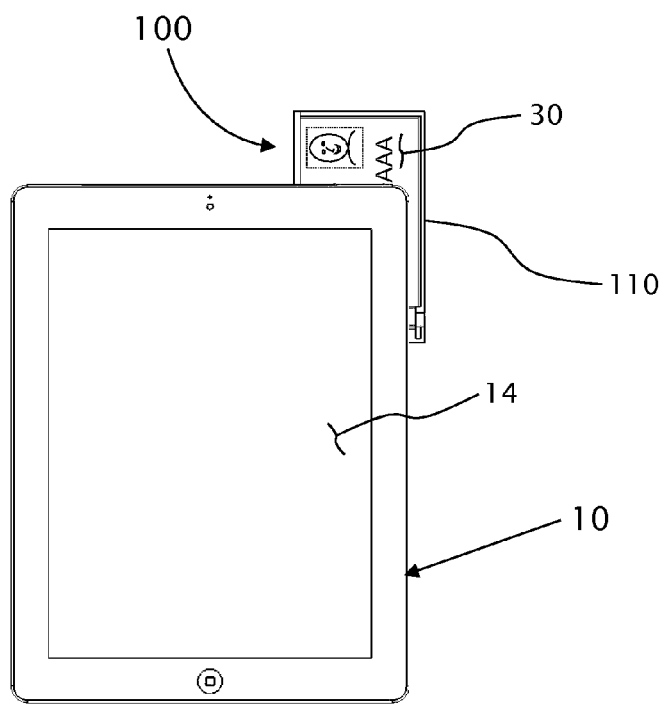
FIG. 14 is a top view illustration of the document-holding-device, in an unfolded operational state.

In the folded state, document-holding-device 100 is attached to tablet PC 10, but folded to facilitate normal operation of tablet PC 10. Reference is also made to FIG. 3, a top, side perspective view illustration of the document-holding-device 100; to FIG. 4, a top perspective view illustration of the document-holding-device 100, in an unfolded operational state; to FIG. 5, a top perspective, exploded view illustration of the document-holding-device 100, in an unfolded operational state; to FIG. 10, a bottom, front perspective view illustration of the document-holding-device 100, as shown in FIG. 1a; to FIG. 11, a bottom, perspective view illustration of the document-holding-device 100, in an unfolded operational state; to FIG. 12, a bottom perspective, exploded view illustration of the document-holding-device 100, in an unfolded operational state; to FIG. 13, a bottom view illustration of the document-holding-device 100, in an unfolded operational state; and to FIG. 14 is a top view illustration of the document-holding-device, in an unfolded operational state.

Mounting-structure 130 includes a generally planer sliding panel 132, pivotally attached to attachment panel 134, wherein the pivotal motion is facilitated by shaft mechanism 136. Typically, with no limitation, in an unfolded state, the angle formed between sliding panel 132 and attachment panel 134 is substantially a right angle.

Sliding interface 120 includes a hollow passage 122 formed in a preconfigured location. Hollow passage 122 is preconfigured to fittingly host sliding panel 132, facilitating sliding panel 132 to slide through hollow passage 122, when moved by the user in direction 125.

Base 140 is securely attached onto back surface 12 of portable imaging apparatus 10, at a preconfigured location. Base 140 includes rails 142 (see FIGS. 5 and 14), configured to fittingly host attachment panel 134, facilitating attachment panel 134 to slide through rails 142, when pushed by the user in direction 145, wherein attachment panel 134 may slide out of rails 142 only when forced out in the opposite direction 145.

Document-tray 110 is pivotally attached to sliding interface 120, wherein the pivoting motion is facilitated by shaft 155. Typically, with no limitation, in an unfolded state, the angle formed between document-tray 110 and sliding panel 132 is substantially a right angle.

Optionally, a fastening mechanism is used to fasten sliding panel 132 to sliding interface 120. The fastening mechanism may be a fastening screw 160, a boss type detachable mechanism (not shown), a biased plunger (not shown), disposed inside an inner wall of hollow passage 122, that fits into a selected bore out of a number of bores (not shown) formed at preconfigured locations along sliding panel 132 that correspond to different types of portable imaging apparatuses 10, or any other type of fastening mechanisms known in the art.

Figure 6:
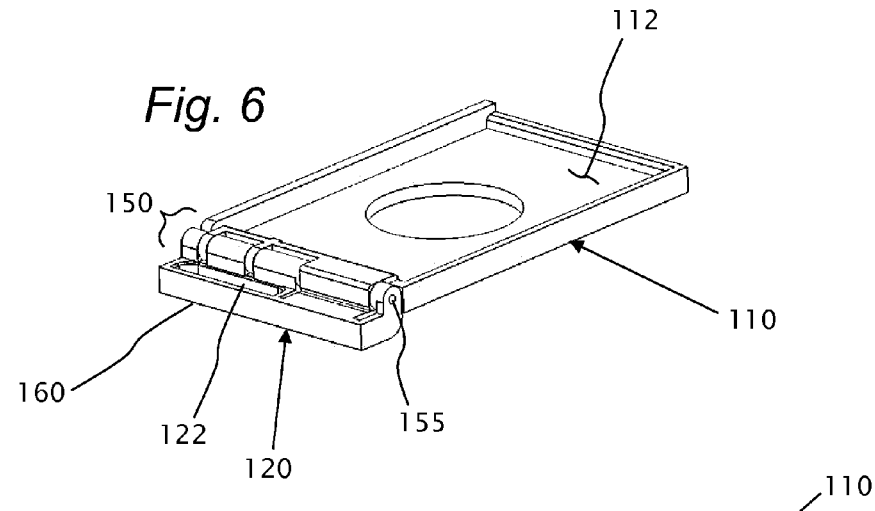
FIG. 6 shows the assembly of the tray and the sliding interface, in an unfolded operational state.
Figure 7:
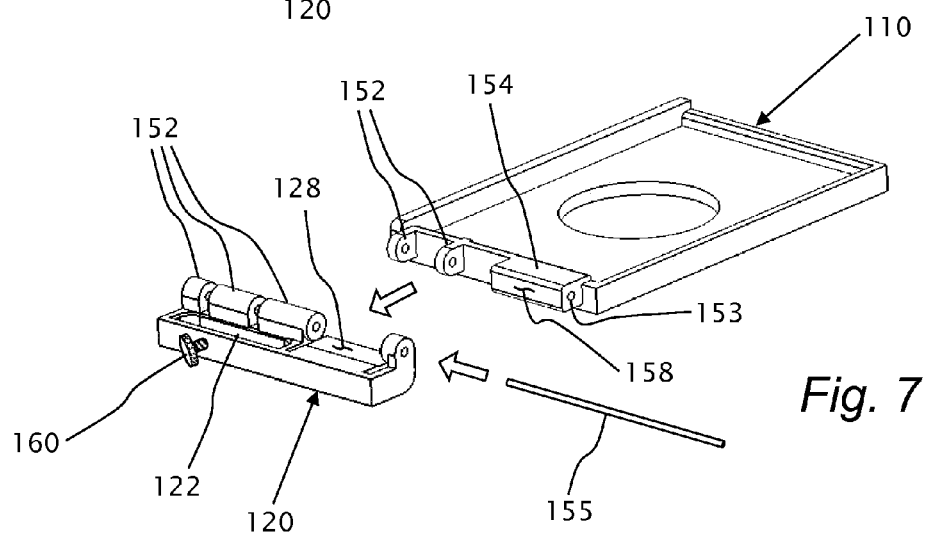
FIG. 7 is an exploded view of the assembly shown in FIG. 6.
Figure 9:
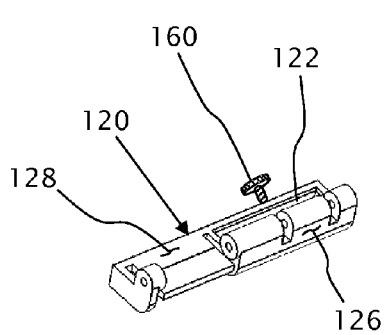
FIG. 9 is a top, rear perspective view illustration of the sliding interface.
Figure 8:
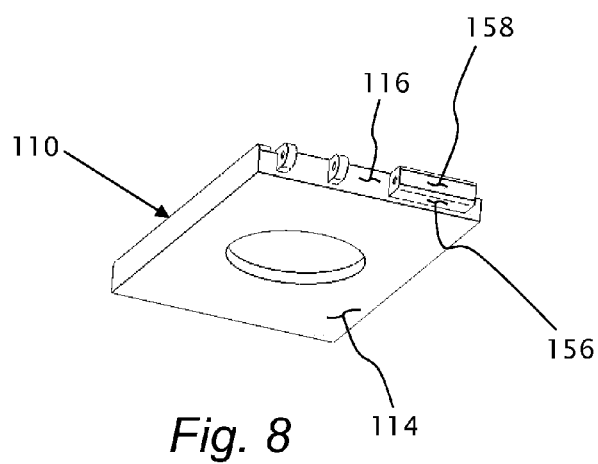
FIG. 8 is a bottom, rear perspective view illustration of the tray.

Reference is also made to FIG. 6, showing the assembly of tray 110 and sliding interface 120, in an unfolded operational state; to FIG. 7, an exploded view of the assembly shown in FIG. 6; to FIG. 8, a bottom, rear perspective view illustration of tray 110; and to FIG. 9, a top, rear perspective view illustration of sliding interface 120. Tray 110 and sliding interface 120 are pivotally interconnected, for example, by a hinge-type mechanism 150, including a fitted cylindrical shaft 155.

In the example shown in the figures, tray 110 and sliding interface 120 include a number of hollow elements wherein the hollow opening formed in the hollow elements is cylindrical to fittingly accommodate cylindrical shaft 155. Typically, the external shape of the hollow elements is cylindrical (152), but at least one of the hollow elements is a cuboid hollow element 154. The hollow opening formed in cuboid hollow element 154 is equidistant from the three exposed faces of cuboid hollow element 154 that are parallel to the rotational axis of cylindrical shaft 155.

Base 140 is securely attached onto back surface 12 of portable imaging apparatus 10, at a preconfigured location, such that when document-holding-device 100 is in the unfolded operational state, the upper surface 112 of document-tray 110 faces camera lens 20 of portable imaging apparatus 10. Preferably, with no limitation, the optical axis 22 of camera lens 20 points towards the center of upper surface 112 of document-tray 110.

Document-holding-device 100 is detachably mounted into base 140, wherein attachment panel 134 is pushed by the user, in direction 145, to slide through rails 142.

In the folded state, as shown in FIGS. 1b and 2b, sliding panel 132 is pivoted about shaft 136 and in direction 135, such that sliding panel 132 is disposed adjacently to back surface 12 of portable imaging apparatus 10. Document-tray 110 is then pivoted about shaft 155 such that external surface 114 of document-tray 110 faces away from smart portable imaging apparatus 10, and upper surface 112 of document-tray 110 faces sliding panel 132. In this state, face 158 of cuboid hollow element 154 leans against face 128 of sliding interface 120 that serves as a stopper to document-tray 110.

To move from the folded state, as shown in FIGS. 1b and 2b, to the operational, unfolded state, as shown in FIGS. 1a and 2a and other figures, document-tray 110 is pivoted about shaft 155 and in a direction opposite to direction 115, such that document-tray 110 is substantially perpendicular to sliding panel 132. In this state, rear face 116 of document-tray 110 leans against front face 126 of sliding interface 120 that serves as a stopper to document-tray 110. It should be noted that face 156 of cuboid hollow element 154 is slightly distant from face 128 of sliding interface 120 to allow the pivotal motion about shaft 155. Then, sliding panel 132 is pivoted about shaft 136 and in a direction opposite to direction 135, such that sliding panel 132 is substantially perpendicular to back surface 12 of portable imaging apparatus 10, as set by stoppers 138 (see FIG. 5), that are preconfigured to sustain the substantially perpendicular configuration.

As shown in FIG. 3, an ID document 30 is placed on upper surface 112 of document-tray 110. The camera of smart portable imaging apparatus 10 views document-tray 110 through camera lens 20, including at least a portion of ID document 30 and preferably, the whole of ID document 30.

Should the assembly of document-tray 110 and sliding interface 120 be slid by the user towards lens 20, along sliding panel 132, the image of ID document 30 will be seen by the user magnified on the screen 14 of smart portable imaging apparatus 10. However, only a portion of ID document 30 may be captured by the field of view of the camera. Should the assembly of document-tray 110 and sliding interface 120 be slid by the user away from lens 20, along sliding panel 132, the image of ID document 30 will be seen by the user smaller on the screen 14 of smart portable imaging apparatus 10.

To use document-holding-devices 100 on a variety of smart portable imaging apparatuses, the user needs to adjust the distance of document-tray 110 from lens 20 of the smart portable imaging apparatus, to thereby adapt to the size of the smart portable imaging apparatus and to the specifications of the optical system of the smart portable imaging apparatus.

Figure 15:
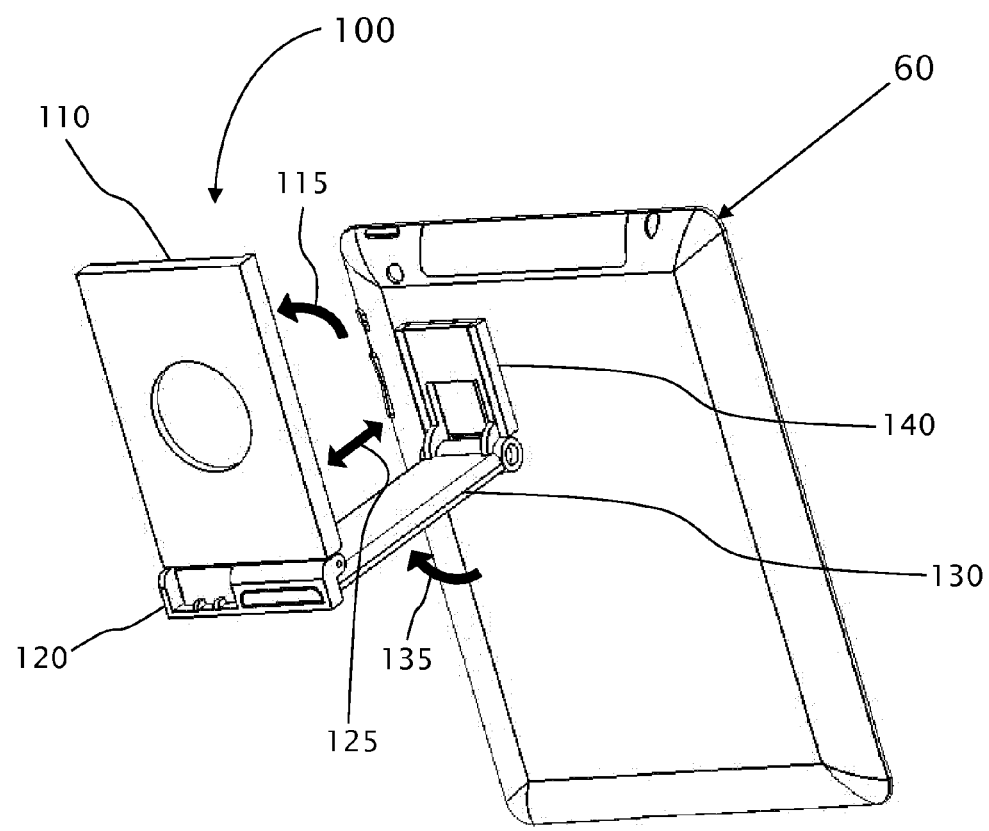
FIG. 15 is a bottom perspective view illustration of a document-holding-device, according to embodiments of the present invention, detachably attached to a small form portable imaging apparatus, such as a smartphone.
Figure 16:
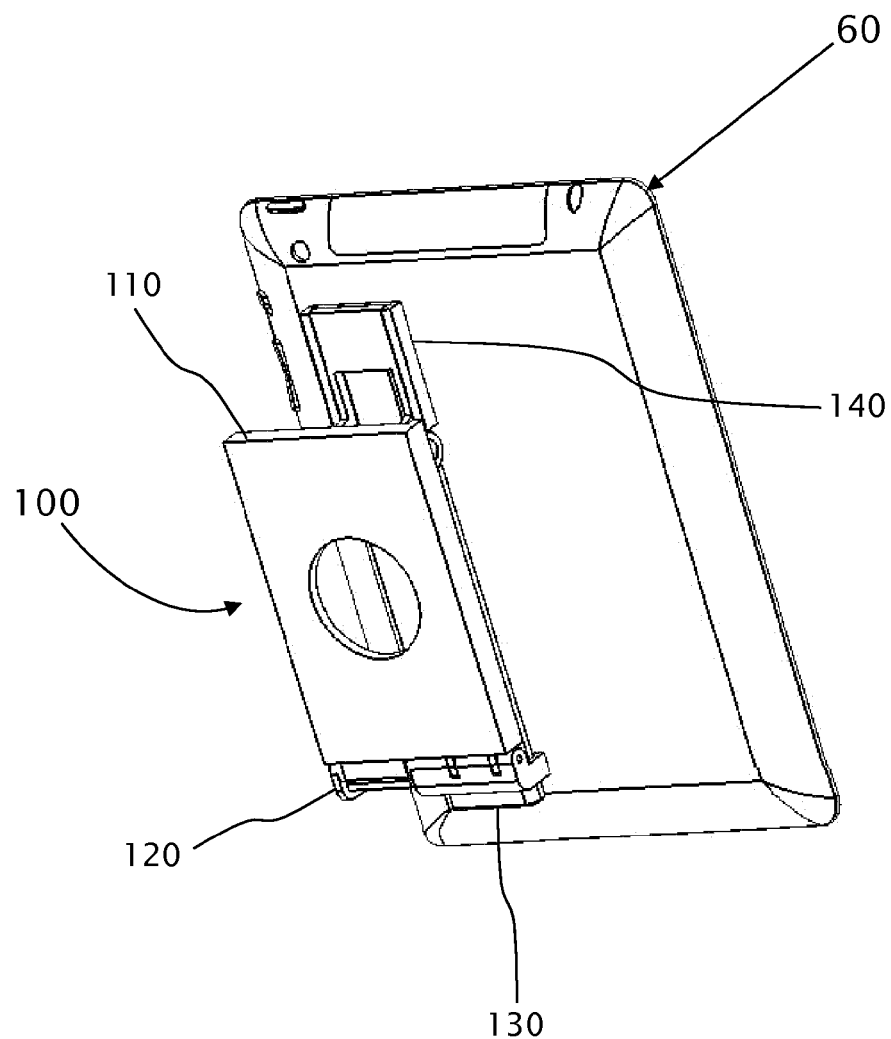
FIG. 16 is a bottom perspective view illustration of the document-holding-device, attached to a small form portable imaging apparatus, as shown in FIG. 15, the document-holding-device being in a folded state.

Reference is now made to another example of a smart portable imaging apparatus FIG. 15, a perspective view illustration of a document-holding-devices 100 for holding a document, detachably attached to a small form smart portable imaging apparatus 60 (referred to herein as "smartphone 60"), such as a smartphone, according to embodiments of the present invention. Reference is also made to FIG. 16, a bottom, rear perspective view illustration of a document-holding-device 100, attached to smartphone 60, as shown in FIG. 15, the document-holding-device being in a folded state.

It should be noted that the document-holding-devices 100 may come in various forms, within the scope of the present invention, to make fine adjustments, in order adapt to the vast variety of smart portable imaging apparatuses available in the market.

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. A detachable document-holding-device for holding a document at a substantially fixated distance from a lens (20) disposed at a back surface (12) of a portable imaging apparatus, the lens having an optical axis, the document-holding-device (100) comprising:
    (a) a document-tray (110), having an upper surface (112) and a rear face (116);
    (b) a sliding interface (120) having a front face (126), an upper face (128) and a hollow passage (122) formed therein at a preconfigured location;
    (c) a mounting-structure (130) comprising:
        i. a generally planer sliding panel (132); and
        ii. an attachment panel (134),
            wherein said sliding panel (132) is pivotally attached by a first shaft mechanism (136) to said attachment panel (134), and wherein said pivotal motion is facilitated by said first shaft mechanism (136);
    (d) a base (140); and
    (e) an attachment/detachment configuration,
wherein said base (140) is securely attached to said back surface (12) of said portable imaging apparatus;
wherein said attachment/detachment configuration is adapted to attach said attachment panel (134) to said base (140), and wherein said mounting-structure (130) is operatively mounted onto said base (140);
wherein said document-tray (110) and said sliding interface (120) are pivotally interconnected, wherein said pivotal motion is facilitated by a second cylindrical shaft (155);
wherein said hollow passage (122) is preconfigured to fittingly accommodate said sliding panel (132), facilitating said sliding panel (132) to slide through said hollow passage (122), when moved by the user, to thereby set the distance between said document-tray (110) and the lens;
wherein when in operational state, said document-tray (110) is substantially perpendicular to said optical axis of the lens, and wherein said upper surface (112) of said document-tray (110) is facing the lens; and
wherein an optical path, having a fixated optical distance, is formed such that when a document (30) is placed onto said upper surface (112) of said document-tray (110), an image of said document (30) is reflected towards the lens of said portable imaging apparatus.

2. The document-holding-device as in claim 1, wherein said attachment/detachment configuration comprises rails (142) formed inside said base (140); wherein said rails (142) are configured to fittingly host attachment panel (134); and wherein said attachment panel (134) may be pushed to slide either in or out of said rails (142).

3. The document-holding-device as in claim 1, wherein said portable imaging apparatus is selected from a group including a tablet PC, a smartphone, a PDA and a digital camera, and wherein said portable imaging apparatus having a generally flat body.

4. The document-holding-device as in claim 3, wherein said digital camera includes and/or is operatively connected to a processor.

5. The document-holding-device as in claim 1, wherein said document is selected from a group including an ID card, a check, a driver's license, a business card, a passport and a medical card.

6. The document-holding-device as in claim 1, wherein said document-tray (110) and said sliding interface (120) include a number of hollow elements (152, 154), securely disposed at preconfigured locations on said rear face (116) of said document-tray (110) and said upper face (128) of said sliding interface (120), and wherein the tubular openings formed in said hollow elements (152, 154) are cylindrical to fittingly accommodate said second cylindrical shaft (155).

7. The document-holding-device as in claim 6, wherein a number of said hollow elements (152) have a cylindrical external shape and at least one of said hollow elements (154) has a cuboid external shape,
    wherein said hollow opening formed in said at least one cuboid hollow element (154) is equidistant from the three exposed faces of said cuboid hollow element (154) that are parallel to the rotational axis of said second cylindrical shaft (155); and
    wherein one (158) of said exposed faces of said cuboid hollow element (154) is substantially perpendicular to said upper surface (112) of said document-tray (110).

8. The document-holding-device as in claim 7, wherein said document-holding-device (100) is foldable, and wherein when in a folded state,
    said sliding panel (132) is pivoted about said first shaft mechanism (136) towards said back surface (12) of said portable imaging apparatus (10), such that said sliding panel (132) is disposed adjacently to said back surface (12); and
    said document-tray (110) is pivoted about said second cylindrical shaft (155) towards said sliding panel (132), such that said document-tray (110) is substantially adjacent to said sliding panel (132) and said upper surface (112) of said document-tray (110) faces said sliding panel (132).

9. The document-holding-device as in claim 8, wherein said perpendicular face (158) of said cuboid hollow element (154) leans against said upper face (128) of said sliding interface (120), and wherein said upper face (128) serves as a stopper to document-tray (110).

10. The document-holding-device as in claim 7, wherein when in an unfolded, operational state,
said document-tray (110) is pivoted about said second cylindrical shaft (155) away from said sliding panel (132), such that said document-tray (110) is substantially perpendicular to said sliding panel (132), wherein said rear face (116) of said document-tray (110) leans against said front face (126) of said sliding interface (120) that serves as a stopper to said document-tray (110);
said sliding panel (132) is pivoted about said first shaft mechanism (136) away from said back surface (12) of said portable imaging apparatus (10), such that said sliding panel (132) is substantially perpendicular to said back surface (12) of the portable imaging apparatus (10), wherein a pair of stoppers (138) are preconfigured to sustain the substantially perpendicular configuration of said sliding panel (132) with respect to said back surface (12).

11. The document-holding-device as in claim 1 further comprising a fastening mechanism (160), used to fasten said sliding panel (132) to said sliding interface (120).

12. The document-holding-device as in claim 11, wherein said fastening mechanism (160) is selected from a group including a fastening screw, a boss type detachable mechanism, a biased plunger disposed inside an inner wall of said hollow passage (122) that fits into a selected bore out of a number of bores formed at preconfigured locations along said sliding panel (132) and any other type of fastening mechanisms known in the art.

13. The document-holding-device as in claim 12, wherein said preconfigured locations of each of said bores, formed along said sliding panel (132), are designed to fit at least one particular portable imaging apparatus (10).

* * * * *